United States Patent
Mo et al.

(10) Patent No.: US 7,075,927 B2
(45) Date of Patent: Jul. 11, 2006

(54) METHOD AND SYSTEM FOR QUALITY OF SERVICE (QOS) SUPPORT IN A PACKET-SWITCHED NETWORK

(75) Inventors: Li Mo, Plano, TX (US); Edward T. Sullivan, Highland Village, TX (US); Carl A. DeWilde, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 943 days.

(21) Appl. No.: 09/848,994

(22) Filed: May 4, 2001

(65) Prior Publication Data
US 2001/0053149 A1    Dec. 20, 2001

Related U.S. Application Data

(60) Provisional application No. 60/202,190, filed on May 5, 2000.

(51) Int. Cl.
*H04L 12/28* (2006.01)
*H04L 12/56* (2006.01)

(52) U.S. Cl. ............... 370/389; 370/401; 370/412; 370/230; 370/415

(58) Field of Classification Search ............... 370/229, 370/230, 236, 351–356, 389, 392, 401, 412, 370/428, 429, 395.2, 395.21, 395.3, 395.4, 370/395.43, 400, 413, 415, 468, 235
See application file for complete search history.

(56) References Cited

U.S. PATENT DOCUMENTS

| | | | |
|---|---|---|---|
| 5,229,990 A | 7/1993 | Teraslinna | 370/60 |
| 5,231,633 A | 7/1993 | Hluchyj et al. | 370/94.1 |
| 5,461,624 A | 10/1995 | Mazzola | 370/85.13 |
| 5,590,133 A | 12/1996 | Billström et al. | 370/349 |
| 5,771,370 A | 6/1998 | Klein | 395/500 |
| 5,781,534 A | 7/1998 | Perlman et al. | 370/248 |
| 5,818,842 A | 10/1998 | Burwell et al. | 370/397 |
| 5,825,772 A | 10/1998 | Dobbins et al. | 370/396 |
| 5,850,399 A * | 12/1998 | Ganmukhi et al. | 370/412 |
| 5,852,606 A | 12/1998 | Prince et al. | 370/393 |
| 5,946,308 A | 8/1999 | Dobbins et al. | 370/392 |
| 5,956,341 A | 9/1999 | Galand et al. | 370/412 |
| 6,018,766 A | 1/2000 | Samuel et al. | 709/218 |

(Continued)

FOREIGN PATENT DOCUMENTS

EP     0 512 495 A2    11/1992

(Continued)

OTHER PUBLICATIONS

PCT International Search Report in International Application No. PCT/US 01/13695, dated Oct. 9, 2001, 6 pages.

(Continued)

*Primary Examiner*—Ajit Patel
(74) *Attorney, Agent, or Firm*—Baker Botts L.L.P.

(57) ABSTRACT

A method and system for transporting traffic having disparate qualities of service classes across a packet-switched network includes receiving at an ingress node of a network a plurality of packets each comprising a quality of service (QoS) class defined externally to the network. Packets having a QoS class comprising delay bound guarantees and a low drop priority are combined into a first internal QoS class. Packets having a QoS class comprising a flexible drop priority and no delay bound guarantees are combined into a second internal QoS class. Packets having a QoS class including no delivery guarantees are combined into a third internal QoS class. The packets are transmitted in the network based on their internal QoS class.

20 Claims, 6 Drawing Sheets

U.S. PATENT DOCUMENTS

| | | | |
|---|---|---|---|
| 6,028,842 A | 2/2000 | Chapman et al. | 370/235 |
| 6,058,113 A | 5/2000 | Chang | 370/390 |
| 6,075,767 A | 6/2000 | Sakamoto et al. | 370/228 |
| 6,205,150 B1* | 3/2001 | Ruszczyk | 370/412 |
| 6,205,158 B1 | 3/2001 | Martin et al. | 370/541 |
| 6,269,079 B1* | 7/2001 | Marin et al. | 370/230 |
| 6,317,426 B1 | 11/2001 | Afanador et al. | 370/352 |
| 6,331,905 B1 | 12/2001 | Ellinas et al. | 359/110 |
| 6,353,593 B1 | 3/2002 | Chen et al. | 370/216 |
| 6,353,616 B1 | 3/2002 | Elwalid et al. | 370/443 |
| 6,359,857 B1 | 3/2002 | Ahmad et al. | 370/217 |
| 6,366,556 B1 | 4/2002 | Ballintine et al. | 370/216 |
| 6,477,670 B1* | 11/2002 | Ahmadvand | 714/712 |
| 6,515,966 B1 | 2/2003 | Bardalai et al. | 370/236 |
| 6,590,885 B1* | 7/2003 | Jorgensen | 370/338 |
| 6,614,790 B1* | 9/2003 | Veres et al. | 370/395.2 |
| 6,654,374 B1* | 11/2003 | Fawaz et al. | 370/394 |
| 6,765,905 B1* | 7/2004 | Gross et al. | 370/389 |
| 2001/0025310 A1 | 9/2001 | Krishnamurthy et al. | 709/223 |

FOREIGN PATENT DOCUMENTS

| | | |
|---|---|---|
| EP | 0 849 970 A2 | 6/1998 |
| EP | 0 959 641 A1 | 11/1999 |
| WO | WO 97/40610 | 10/1997 |
| WO | WO 98/00954 | 1/1998 |
| WO | WO 99/11090 | 3/1999 |
| WO | WO 99/66675 | 12/1999 |
| WO | WO 00/10357 | 2/2000 |
| WO | WO 00/21254 | 4/2000 |
| WO | WO 00/24164 | 4/2000 |

OTHER PUBLICATIONS

International Search Report in International Application No. PCT/US 01/13723, dated Oct. 31, 2001, 7 pages.

International Search Report in International Application No. PCT/US 01/13725, dated Oct. 31, 2001, 6 pages.

International Search Report in International Application No. PCT/US 01/14624, dated Nov. 6, 2001, 6 pages, Nov. 11, 2001.

PCT Invitation to Pay Additional Fees in International Application No. PCT/US 01/13732, dated Nov. 7, 2001, 4 pages.

Tsong-Ho Wu, "A Passive Protected Self-Healing Mesh Network Architecture and Applications," XP 000446089, *IEEE/ACM Transactions on Networking*, Feb. 1994, 13 pages.

Birman A et al.: "Support for RSVP-Based Service Over ATM Networks," Communications: The Key to Global Prosperity. Globecom 1996. Global Internet 96 Conference Record. London, Nov. 18-22, 1996, Global Telecommunications Conference (Globecom, New York, IEEE, US, vol. SUPP, Nov. 18, 1996 pp. 10-15, XP000741665 ISBN: 0-7803-3337-3.

Sharma et al.: "Scalable timers for soft state protocols," Infocom '97. Sixteenth Annual Joint Conference of the IEEE Computer and Communications Societies. Driving the Information Revolution., Proceedings IEEE Kobe, Japan Apr. 7-11, 1997, Los Alamitos, CA USA, IEEE Comptu. Soc, US Apr. 7, 1997, pp. 222-229, XP010252006, ISBN: 0-8186-7780-5.

International Search Report in International Application. No. PCT/US01/14626, dated Feb. 5, 2002, 7 pages.

International Search Report in International Application No. PCT/US01/14622, dated Feb. 14, 2002, 7 pages.

Pancha P: "ATM Switch Routers for Combined Connection-Oriented and Connectionless Transport," ISS '97. World Telecommunications Congress. (Int'l Switching Symposium). Global Network Evolution: Convergence or Collision? Toronto, Sep. 21-26, 1997, ISS. World Telecommunications Congress. (International Switching Symposium).

Mysore J. P. et al.: "Performance of transport protocols over a multicasting-based architecture fr Internet host mobility" Communications, 1998. ICC 98. Conference Record. 1998 IEEE International Conference on Atlanta, GA, USA Jun. 7-11, 1998, New York, NY USA, IEEE, US, Jun. 7, 1998, pp. 1817-1832, XP010284635, ISBN: 0-7803-4788-9.

Bar-Noy A. et al.: "Topology Distribution Cost Vs. Efficient Routing in Large Networks," Computer Communications Review, Association for Computing Machinery, New York, US, vol. 20, No. 4, Sep. 1, 1990, pp. 242-252, XP000168058; ISSN: 0146-4833, whole document.

International Search Report in International Application No. PCT/US01/13694, dated Mar. 12, 2002, 7 pgs.

Fritz J: "Bullet Proofing ATM: Part I," Byte, McGraw-Hill Inc. St. Peterborough, US, vol. 22, No. 6, Jun. 1, 1997, pp. 59-60, XP000691556, ISSN: 0360-5280, p. 60.

Sun H. et al.: "Supporting IP on the ATM networks: an overview," Computer Communications, Elsevier Science Publishers BV, Amsterdam, NL, vol. 21, No. 11, Aug. 10, 1998, pp. 1020-1029, XP004138773, ISSN: 0140-3664, whole document.

Law A M et al: "Simulation Software for Communications Networks: The State of the Art," IEEE Communications Magazine, IEEE Service Center. Piscataway, N.J., US, vol. 32, No. 3, Mar. 1, 1994, p. 1, col. 2, line 4-p. 2, col. 1, line 39, p. 4, col. 1, line 3-p. 6, col. 1, paragraph 6; XP 000442186.

International Search Report in International Application No. PCT/US01/14615, dated Apr. 5, 2002, 7 pages.

International Preliminary Examination Report in International Application No. PCT/US01/13725, dated Jun. 4, 2002, 5 pages.

International Preliminary Examination Report in International Application No. PCT/US01/13732, dated Jul. 12, 2002, 5 pages.

International Preliminary Examination Report in International Application No. PCT/US01/13695, dated Oct. 30, 2002, 4 pages.

Form PCT/IPEA/416, *Notification of Transmittal of International Preliminary Examination Report*, with attached Form PCT/IPEA/409, *PCT International Preliminary Examination Report* (5 pages), for PCT/US01/13694 dated Mar. 19, 2003.

Kermani, et al., "*Virtual Cut-through: A New Computer Communication Switching Technique*", Computer Networks, vol. 3, Cover, Table of Contents and pp. 267-285, 1979.

Cidon, et al., "*MetaRing—A Full Duplex Ring with Fairness and Spatial Reuse*", IEEE Transactions on Communications, vol. 41, Cover and pp. 110-120, Jan. 1993.

Ofek, et al., "*METANET: Principles of an Arbitrary Topology LAN*", IEEE Transactions on Networking, vol. 3, No. 2, Cover and pp. 169-180, Apr. 1995.

West, "*Introduction to Graph Theory*", Prentice Hall, ISBN 0-13-227828-6, QA166.W43 1996, 7 pages Cover, ISBN page, Table of Contents, and pp. 51-85.

Hunter, et al., "*WASPNET: A Wavelength Switched Packet Network*", IEEE Communications Magazine, 2-page cover and pp. 120-129, Mar. 1999.

Hernandez-Valencia, "*A Simple Data Link (SDL) Framing Protocol for High-Speed Optical Packet Networks*", OIF99.043.0, pp. 1-21, May 4, 1999.

Simpson, "The Point-to-Point Protocol (PPP)", Daydreamer, RFC-1661, 50 pages, Jul. 1994.
Katz, et al., "Traffic Engineering Extensions to OSPF", IETF Draft, draft-katz-yeung-ospf-traffic-01.txt, pp. 1-8, Oct. 1999.
Crawley, et al., "A Framework for Qos Based Routing in the Internet", RFC 2386, 35 pages, Aug. 1998.
Wimer, et al., FORE Systems, Inc.,"OSPF Sub-Areas", IETF Draft, draft-wimer-ospf-sub-areas-00.txt, 13 pages, Oct. 1999.
Wimer, et al., FORE Systems, Inc., "Additional OSPF Extensions for Traffic Engineering and Qos Routing", IETF Draft, draft-wimer-ospf-traffic-00.txt, 5 pages, Feb. 1999.
Yeung, "OSPF Extensions for Traffic Engineering", IETF Draft, draft-yeung-ospf-traffic-00.txt, 9 pages, Feb. 1999.
Apostolopoulos, et al., "Qos Routing Mechanism and OSPF Extensions", RFC 2676, 47 pages, Aug. 1998.
Smit, et al., "IS-IS Extensions for Traffic Engineering", IETF Draft, draft-ietf-isis-traffic-00.txt, 10 pages, May 1999.
Awduche, et al., UUNET (MCI WorldCom), "Requirements for Traffic Engineering Over MPLS", RFC 2702, 28 pages, Sep. 1999.
Blake, et al., "An Architecture for Differentiated Services", RFC 2475, 34 pages, Dec. 1998.
Braden, et al., "Resource ReSerVation Protocol (RSVP)", Version 1 Functional Specification, RFC 2205, 105 pages, Sep. 1997.
Wroclawski, "Specification of the Controlled-Load Network Element Service", RFC 2211, 18 pages, Sep. 1997.
Shenker, et al., "Specification of Guaranteed Quality of Service", RFC 2212, 19 pages, Sep. 1997.
Reynolds, et al., ISI, "Assigned Numbers", RFC 1700, 215 pages, Oct. 1994.
Jacobson, et al., "An Expedited Forwarding PHB", RFC 2598, 11 pages, Jun. 1999.
Heinanen, et al., "Assured Forwarding PHB Group", RFC 2597, 11 pages, Jun. 1999.
Manchester, et al., Bell Laboratories, "IP over SONET", IEEE Communications Magazine, vol. 36, No. 5, cover and pp. 136-142, May 1998.
Heinanen, Telecom Finland "Multi-Protocol Encapsulation over ATM Adaptation Layer 5", RFC 1483, 15 pages, Jul. 1993.
The ATM Forum, Technical Committee, "Private Network-Network Interface Specification Version 1.0", af-pnni-0055.000, cover, introduction, acknowledgements and table of contents (18 pages) and 366 pages of text, Mar. 1996.
Callon, Digital Equipment Corporation, "Use of OSI IS-IS for Routing in TCP/IP and Dual Environments", RFC 1195, 80 pages, Dec. 1990.
Moy, Ascend Communications "OSPF Version 2", RFC 2328, 204 pages, Apr. 1998.
Malkin, Bay Networks, "RIP Version 2", RFC 2453, 37 pages, Nov. 1998.
Rekhter, et al., "A Border Gateway Protocol 4 (BGP-4)", RFC 1771, 54 pages, Mar. 1995.
Goguen, et al., "RSVP Label Allocation for Backup Tunnels", draft-swallow-rsvp-bypass-label-00.txt, IETF Document, 10 pages, Oct. 1999.
Callon, et al., "A Framework for MPLS", draft-ietf-mpls-framework-05.txt, IETF document, 69 pages, Sep. 1999.
Rosen, et al., "Multiprotocol Label Switching Architecture", draft-ietf-mpls-arch-06.txt, IETF Document, 62 pages, Feb. 1999.
Rosen, et al., "MPLS Label Stack Encoding", IETF document, draft-ietf-mpls-label-encaps-07.txt, 22 pages, Sep. 1999.
Andersson, et al., "LDP Specification", IETF document, draft-ietf-mpls-ldp-06.txt, 124 pages, Oct. 1999.
Jamoussi, Nortel Networks Corp., "Constraint-Based LSP Setup Using LDP", draft-ietf-mpls-cr-ldp-03.txt, IETF Document, pp. 1-39, Sep. 1999.
Guerin, "Qos Routing in Networks with Inaccurate Information: Theory and Algorithms", IEEE/ACM Transactions on Networking, vol. 7, No. 3, cover and pp. 350-364, Jun. 1999.
Parekh, et al., "A Generalized Processor Sharing Approach to Flow Control in Integrated Services Networks: The Single Node Case", IEEE Transactions on Networking, vol. 1, No. 3, cover and pp. 344-357, Jun. 1993.
Parekh, et al., "A Generalized Processor Sharing Approach to Flow Control in Integrated Services Networks: The Multiple Node Case", IEEE Transactions on Networking, vol. 2, No. 2, cover and pp. 137-150, Apr. 1994.
Golestani, "A Self-Clocked Fair Queuing Scheme for Broadband Applications", Proceedings of IEEE Infocom '94, Toronto, Ontario, Canada, cover and pp. 636-646, Jun. 1994.
Zhang, "Virtual Clock: A New Traffic Control Algorithm for Packet Switching Networks", ACM SIGCOMM Computer Communication Reviews, vol. 20, No. 4, pp. 19-29, Sep. 1990.
Ferrari, et al., "A Scheme for Real-Time Channel Establishment in Wide-Area Networks", IEEE Journal on Selected Areas in Communications, vol. 8, No. 3, cover and pp. 368-379, Apr. 1990.
Wrege, et al., "A Near-Optimal Packet Scheduler for QoS Networks", Proceedings of IEEE Infocom '97, Kobe, Japan, cover and pp. 576-583, Apr. 7-12, 1997.
Golestani, "A Stop-and-Go Queuing Framework for Congestion Management", ACM SIGCOMM Computer Communications Review, vol. 20, No. 4., pp. 8-18, Sep. 1990.
Kalmanek, et al., "Rate Controlled Servers for Very High-Speed Networks", Proceedings of IEEE Globecom '90, San Diego, CA, Conference Record vol. 1 of 3, cover and pp. 300.3.1-300.3.9, Dec. 2-5, 1990.
Sriram, K., "Methodologies for Bandwidth Allocation, Transmission, Scheduling and Congestion Avoidance in Broadband ATM Networks", Proceedings of IEEE Globecom, '92, Orlando, FL, Conference Record vol. 3 of 3, cover and pp. 1545-1551, Dec. 6-9, 1992.
Jacobson, et al., "Random Early Detection Gateways for Congestion Avoidance", ACM/IEEE Transactions on Networking, vol. 1, No. 4, cover and pp. 397-413, Aug. 1993.
Braden, et al., "Recommendations on Queue Management and Congestion Avoidance in the Internet", RFC 2309, 16 pages, Apr. 1998.
Jacobson, "Notes on Using RED for Queue Management and Congestion Avoidance", Network Research Group, Berkeley National Laboratory, Berkeley, CA, NANOG 13, Dearborn, MI, cover and 15 pages, Jun. 8, 1998.
May, et al., "Analytic Evaluation of RED Performance", pp. 1-10, Jun. 1998.
May, et al., "Reasons Not To Deploy RED", pp. 1-5, May 1999.
Lakshman, et al., "SRED: Stabilized RED", pp. 1-10, Mar. 1999.

Feng, et al., "*BLUE: A New Class of Active Queue Management Algorithms*", pp. 1-27, Mar. 1999.

Cisco's "*Distributed Weighted Random Early Detection*", Source=http://www.cisco.com/univercdcc/td/doc/product/software/ios111/cc111/wred.htm#xtocid236360, 17 pages, Feb. 9, 1998.

J. Wroclawski, MIT LCS "*The Use of RSVP with IETF Integrated Services*", RFC 2210, 31 pages, Sep. 1997.

Shenker, et al., "*General Characterization Parameters for Integrated Service Network Elements*", RFC 2215, 15 pages, Sep. 1997.

Braden, et al., "*RAPI—An RSVP Application Programming Interface, Version 5*", Internet Draft, 25 pages, Aug. 11, 1998.

Katsube, et al., "*Toshiba's Router Architecture Extensions for ATM: Overview*", RFC 2098, 17 pages, Feb. 1997.

Rekhter, et al., "*Cisco Systems' Tag Switching Architecture Overview*", RFC 2105, 13 pages, Feb. 1997.

Viswanathan, et al., "*ARIS: Aggregate Route-Based IP Switching*", Internet draft, 19 pages, Mar. 1997.

Newman, et al., "*Ipsilon Flow Management Protocol Specification for IPv4 Version 1.0*", RFC 1953, 19 pages, May 1996.

Davie, et al., "*Switching in IP Networks*", ISBN 1-558650-505-3, TK5105.875.157,D38, Morgan Kaufmann Publishers, Inc., San Francisco, CA, 8 pgs. cover, ISBN page, table of contents, pp. 27-55, 117-154, 219-232, 1998.

Moy, Proteon, Inc., "*OSPF Version 2*", RFC 1583, 202 pages, Mar. 1994.

Fuller, et al., "*Classless Inter-Domain Routing (CIDR): An Address Assignment and Aggregation Strategy*", RFC 1519, 23 PAGES, Sep. 1993.

Dumortier, "*Toward a New IP over ATM Routing Paradigm*", IEEE Communications Magazine, 2-page cover and pp. 82-86, Jan. 1998.

White, et al., "*ATM Switching and IP Routing Integration: The Next Stage in Internet Evolution?*", IEEE Communications Magazine, 2-page cover and pp. 79-83, Apr. 1998.

Viswanathan, et al., "*Evolution of Multiprotocol Label Switching*", IEEE Communications Magazine, 2-page cover and pp. 165-173, May 1998.

Laubach, "*Classical IP and ARP over ATM*", RFC 1577, 16 pages, Jan. 1993.

Callon, et al., "*A Framework for Multiprotocol Label Switching*", Internet-Draft, 65 pages, Nov. 1997.

Schmidt, et al., "*Multiprotocol over ATM—Building State of the Art ATM Intranets*", Manning Publications Co., ISBN 1-884777-42-2, TK5105.875.16S36, 8 pgs. cover, ISBN page, table of contents, and pp. 207-289, 1998.

Halabi, "*Internet Routing Architecture*", Cisco Systems, New Riders, Cisco Press, 6 pgs. cover, ISBN page table of contents, and pp. 87-190, 1997.

Finn, et al., "*LAN Emulation over ATM Version 2.0—LUNI Specification*", The ATM Forum Technical Committee, AF-LANE-0084.000, 153 pages, Jul. 1997.

Alexander, et al., "*Multi-Protocol over ATM Version 1.0*", AF-MPOA-0087.000, The ATM Forum Technical Committee, 154 pages, Jul. 1997.

Deering, Stanford University, "*Host Extensions for IP Multicasting*", STD 5, RFC 1112, 16 pages, Aug. 1989.

Sahinoglu, et al., "*On Multimedia Networks: Self-Similar Traffic and Network Performance*", IEEE Communications Magazine, vol. 37, No. 1, cover and pp. 48-52, Jan. 1999.

Fishburn, et al., "*Dynamic Behavior of Differential Pricing and Quality of Service Options for the Internet*", Proc. First Inter. Conf. on Information and Computation Economics (ICE-98), ACM Press, 1998, pp. 128-139.

Steinmetz, et al., "*Multimedia: Comuting Communications and Applications*", Prentice Hall, ISBN 0-13-324435-0, QA76.575.S73, cover, acknowledgment page, LOC page, Index (15 pgs) and pp. 420-450, 1995.

Gale, et al., "*College Admissions and the Stability of Marriage*", The American Mathematical Monthly, vol. 69, No. 1, cover and pp. 9-15, 1962.

McKeown, "*Scheduling Algorithms for Input-Queued Cell Switches*", Ph.D. Thesis, Univ. of California at Berkeley, UMI No. 9602658, 12 pages cover, introduction, acknowledgment and index pages, 119 pages text, 1995.

Simpson, Daydreamer, "*PPP over SONET/SDH*", RFC 1619, 6 pages, May 1994.

Simpson, Daydreamer, "*Point-to-Point Protocol (PPP)*", RFC 1661, 50 pages, Jul. 1994.

Simpson, Daydreamer, "*PPP in HDLC-Like Framing*", RFC 1662, 24 pages, Jul. 1994.

McCloghrie, et al., "*Management Information Base for Network Management of TCP/IP-Based Internets: MIB-II*", RFC 1213, 66 pages, Mar. 26, 1991.

Baker, et al., Cisco Systems, "*OSPF Version 2 Management Information Base*", RFC 1850, 75 pages, Nov. 1995.

Baker, et al., Cisco Systems, "*RSVP Management Information Base Using SMIv2*", RFC 2206, 60 pages, Sep. 1997.

Kastenholz, FTP Software, Inc., "*The Definitions of Managed Objects for the Link Control Protocol of the Point-to-Point Protocol*", RFC 1471, 24 pages, Jun. 1993.

Kastenholz, FTP Software, Inc., "*The Definitions of Managed Objects for the IP Network Control Protocol of the Point-to-Point Protocol*", RFC 1473, 10 pages, Jun. 1993.

Baker, Cisco Systems, "*IP Forwarding Table MIB*", RFC 2096, 20 pages, Jan. 1997.

Awduche, et al., draft-ietf-tewg-framework-01.txt (IETF), "*A Framework for Internet Traffic Engineering*", 63 pages, Jul. 2000.

U.S. Appl. No. 09/588,634, entitled "*Method and System for Providing a Protection Path for Connection-Oriented Signals in a Telecommunications Network*", inventors Mo, et al., 32 pages specification, claims and abstract and 3 pages of drawings, Jun. 6, 2000.

U.S. Appl. No. 09/589,038, entitled "*Method and System for Providing a Protection Path for Connectionless Signals in a Telecommunications Network*", inventors Mo, et al., 38 pages specification, claims and abstract and 9 pages of drawings, Jun. 6, 2000.

U.S. Appl. No. 09/588,806, entitled "*Transport Network and Method*", inventors Mo, et al., 40 pages specification, claims and abstract and 9 pages of drawings, Jun. 6, 2000.

U.S. Appl. No. 09/588,636, entitled "*Method and System for Transporting Traffic in a Packet-Switched Network*", inventors Mo, et al., 32 pages specification, claims and abstract and 6 pages of drawings, Jun. 6, 2000.

U.S. Appl. No. 09/588,632, entitled "*System and Method Connectionless/Connection Oriented Signal Transport*", inventors Mo, et al., 44 pages specification, claims and abstract and 7 pages of drawings, Jun. 6, 2000.

U.S. Appl. No. 09/848,871, entitled "*Method and System for Modeling and Advertising Asymmetric Topology of a Node in a Transport Network*", inventors Jaber, et al., 35 pages specification, claims and abstract and 10 pages of drawings, May 4, 2001.

U.S. Appl. No. 09/849,003, entitled *"Unique Address Space and Method for a Transport Network"*, inventor Edwin Alton Harbin, 36 pages specification, claims and abstract and 10 pages of drawings, May 4, 2001.

U.S. Appl. No. 09/849,010, entitled *"Method and System for Hardware Simulation"*, inventors Richard L. Klevans, et al., 28 pages specification, claims and abstract and 7 pages of drawings, May 4, 2001.

* cited by examiner

METHOD AND SYSTEM FOR QUALITY OF SERVICE (QOS) SUPPORT IN A PACKET-SWITCHED NETWORK

RELATED APPLICATIONS

This application claims the benifit of U.S. Provisional Application Ser. No. 60/202,190, entitled INTERNET PROTOCOL TRANSPORT, filed May 5, 2000 which is hereby incorporated by reference.

TECHINCAL FIELD OF THE INVENTION the present invention relates generally to the field of telecommunication networks, and more particularly to a method and system for quality of service (QoS) support in a packet-switched network.

BACKGROUND OF THE INVENTION

Telecommunication networks transport voice and data according to a variety of standards and using a variety of technologies. Circuit-switch networks such as plain old telephone service (POTS) utilize transmission paths dedicated to specific users for the duration of a call and employ continuous, fixed-bandwidth transmission. Packet-switch networks (PSNs) allow dynamic bandwidth, depending on the application, and can be divided into connectionless networks with no dedicated paths and connection-oriented networks with virtual circuits having dedicated bandwidth along a predetermined path. Because packet-switched networks allow traffic from multiple users to share communication links, these networks utilize available bandwidth more efficiently than circuit-switched networks.

Internet protocol (IP) networks are connectionless packet-switched networks. IP networks transport information by breaking up bitstreams into addressable digital packets. Each IP packet includes source and destination addresses and can take any available route between the source and the destination. The IP packets are transmitted independently and then reassembled in the correct sequence at the destination.

Conventional IP networks employ routers to direct packets to their destination. Packets are inspected at each router for network protocol addresses and forwarded to a next router on the way toward the destination based on downstream congestion and other real-time parameters. While this inspection and dynamic routing provides a high degree of flexibility within the network, it adds delays to each packet at each router. Accordingly, traffic transported across an IP network between geographically distributed source and destination points will have a relatively large cumulative delay. This limits the ability of the IP network to support voice, video, and other real-time applications.

SUMMARY OF THE INVENTION

The present invention provides an improved method and system for transporting traffic in a packet-switched network that substantially eliminate or reduce the problems and disadvantages associated with previous systems and methods. In a particular embodiment, the present invention maps external quality of service (QoS) classes into a reduced set of internally defined QoS classes while supporting essential features of the external QoS classes.

In accordance with one embodiment of the present invention, a method and system for transporting traffic having disparate qualities of service classes across a packet-switched network includes receiving at an ingress node of a private or other suitable network a plurality of packets each having a quality of service (QoS) class defined externally to the network. Packets having a QoS class including delay bound guarantees and a low drop priority are combined into a first internal QoS class. Packets having a QoS class including a flexible drop priority and no delay bound guarantees are combined into a second internal QoS class. Packets having a QoS class including no delivery guarantees are combined into a third internal QoS class. The packets are transmitted across the network based on their internal QoS classes.

Technical advantages of the present invention include providing an improved packet-switched network. In a particular embodiment, QoS support is efficiently provided for the packet-switched network. This allows provisioning of enhanced services and service differentiation by the network provider without high implementation cost.

Another technical advantage of the present invention includes providing voice, video and other real-time support for Internet protocol (IP) traffic using a partial QoS feature set in which non-essential features of well defined or standardized QoSs are combined into behavior aggregate classes. As a result, the number of internal QoS classes is reduced and the complexity to network reduced.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
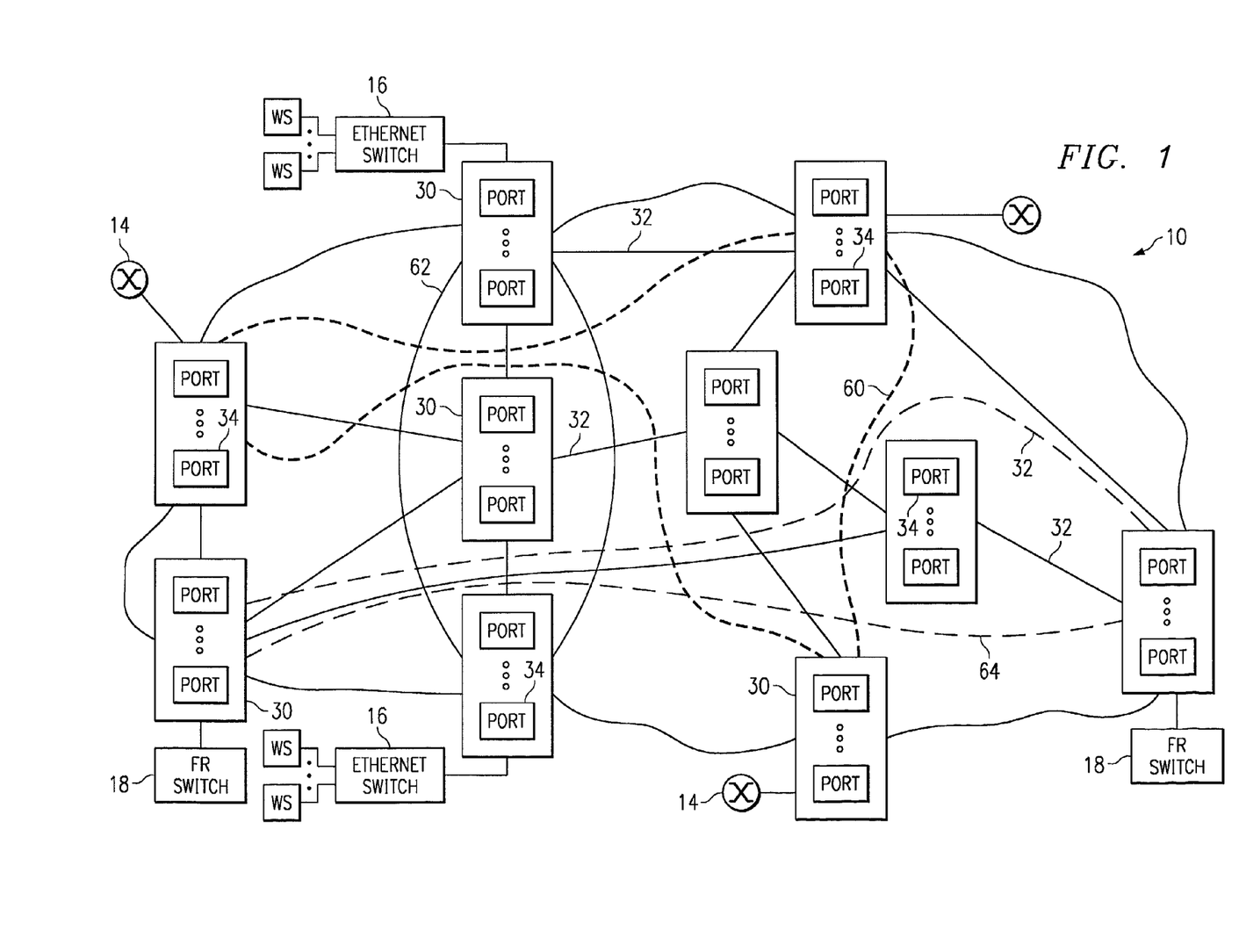
FIG. 1 is a block diagram illustrating a transport network in accordance with one embodiment of the present invention.

FIG. 1 illustrates a transport network 10 in accordance with one embodiment of the present invention. In this embodiment, the transport network 10 is an Internet protocol (IP) network for transporting IP and Multiple Protocol Label Switch (MPLS) packets. The transport network 10 may be any other packet-switched network operable to route, switch, and/or otherwise direct data packets based on network protocol addresses.

The transport network 10 is a private network connecting geographically distributed segments of an external network 12. The external network 12 includes one or more public and/or private networks such as the Internet, an intranet, and other suitable local area networks (LAN), wide area networks (WAN), and nodes. The external network 12 includes label switch and subtending routers 14, Ethernet switches 16, Frame Relay switches 18 and other suitable routers, switches, and nodes operable to generate and/or transport traffic. The transport network 10 communicates with nodes of the external network 12 in the native protocol of the nodes to communicate traffic and control signaling between the networks 10 and 12.

Referring to FIG. 1, the transport network 10 includes a plurality of Internet protocol transport (IPT) nodes 30 interconnected by communication links 32. The IPT nodes 30 each include a plurality of ports 34 accessible to the external network 12. As used herein, each means every one of at least a subset of the identified items. The communication links 32 are optical fiber or other suitable high-speed links. As described in more detail below, the high-speed links 32 connect high speed interfaces of the IPT nodes 30 to form fast transport segments (FTS) through the transport network 10. Packets transferred via the FTSs incur very small buffering delay in the network. Packets carried through the ports 34 and between FTSs may incur queuing delay comparable to a normal IP switch.

To optimize bandwidth usage within the transport network 10, packets may be transmitted directly on the high-speed optical links 32 without synchronous optical network (SONET) framing and its associated overhead which imposes a penalty of three to five percent depending on the line rate. In one embodiment, a transport label is added to each packet to generate an internal packet that can be directly transmitted on the optical links 32. Transport label may be include format information indicating the type of signal being transmitted, a label value including a destination network address for a connectionless flow or a path identifier for a connection-oriented flow, a quality of service (QoS) identifier, an end-of-stack indicator, and time-to-live information. Details of the transport label are described in co-owned U.S. Patent Application entitled "System and Method for Connectionless/Connection Oriented Signal Transport", filed Jun. 6, 2000. Using the transport label, both connection-oriented and connectionless traffic may be seamlessly transported across the transport network 10. Protection for connection oriented data flows may be provided as described in co-owned U.S. Patent Application entitled "Method and System For Providing A Protection Path For Connection-Oriented Signals In A Telecommunications Network", filed Jun. 6, 2000. Protection for connectionless traffic flows may be provided as described in co-owned U.S. Patent Application "Method and System For Providing A Protection Path For Connectionless Signals In A Telecommunications Network", filed Jun. 6, 2000.

To support voice, video, and other real-time or time-sensitive applications, the transport network 10 provides quality of service (QoS), which may include class of service (CoS), differentiation. In one embodiment, all IP packets are mapped to one of three priority levels as they enter the transport network 10. In this embodiment, guaranteed traffic has reserved bandwidth and is guaranteed to be transported within a defined time delay. Control flow traffic is also reserved and guaranteed, but the network 10 does not guarantee delivery time delay. Best effort traffic does not have reserved bandwidth and delivery is not guaranteed by the network 10. By distinguishing and prioritizing traffic based on its QoS priority, including CoS and/or service level agreement (SLA), and/or other suitable indication of importance or delivery constraints, the transport network 10 is able to deliver time-sensitive traffic within tight time constraints by delaying and/or dropping best effort traffic and other low priority traffic.

In one embodiment, the transport network 10 utilizes a private internal addressing scheme to isolate the network 10 from customers and thus minimize or prevent conflicts with private and/or public networks connected to the transport network 10. This reduces the complexity of network management and preserves the topology of the existing routed network 12. In addition, transport network isolation enables value added services to be provided through the transport network 10.

When an independent addressing scheme is utilized for the transport network 10, egress traffic is converted from the external addressing scheme to the internal addressing scheme at ports 34 using standardized or extended network address translation (NAT). Similarly, egress traffic is converted from the internal addressing scheme back to the external addressing scheme at ports 34 using standard or extended NAT. In addition to the internal addresses, each IPT node 30, port 34 and other component of the transport network 10 visible to the external network 12 includes a globally unique IP address. These addresses are used for external management of the transport network 10.

The transport network 10 provides a flexible topology in which sets of ports 34 may be grouped in any suitable way and each treated as a single entity capable of independently interacting with external nodes. Thus, the transport network 10 is externally represented as sets of port groups 50 with internally managed connectivity. Provisioning of port groups 50 in the transport network 10 is unconstrained with mesh and partial-mesh topologies supported.

The port groups 50 are each a set of ports 34 with similar routing properties. In particular, a port group 50 is a set of ports 34 configured to provide multipoint-to-multipoint or at least point-to-multipoint connectivity between each other which allows point-to-multipoint connectivity between external elements. Accordingly, traffic received by a port group 50 can be routed directly from an ingress port 34 to a plurality of egress ports 34 without channelization in the transport network 10.

Port groups 50 may be provisioned as simple port groups and as composite port groups. In the simple port group configuration, each port 34 only belongs to a single port group 50. Private addresses can be supported inside the simple port group configuration. A composite port group includes ports 34 which have membership in multiple port groups 50. In the composite port group case, private IP addressing is not supported.

The port groups 50 each define a transport element 52 with geographically distributed ports 34. Each transport element 52 is assigned a unique global IP address for peering and protocol exchanges within and/or external to the transport network 10. As described in more detail below, the transport elements 52 may implement a distributed architecture in which local processors control each of the ports 34 and a centralized processor controls the network element 52.

In particular embodiments, the transport elements may be transport routers 60 interconnecting sets of subtending IP routers 14, transport Ethernet switches 62 interconnecting sets of subtending Ethernet switches 16, and transport Frame Relay switches 64 interconnecting sets of subtending Frame Relay switches 18. In addition, the transport element 52 may interconnect two ports transparently, in which case the port group 50 is user protocol independent.

Figure 2:
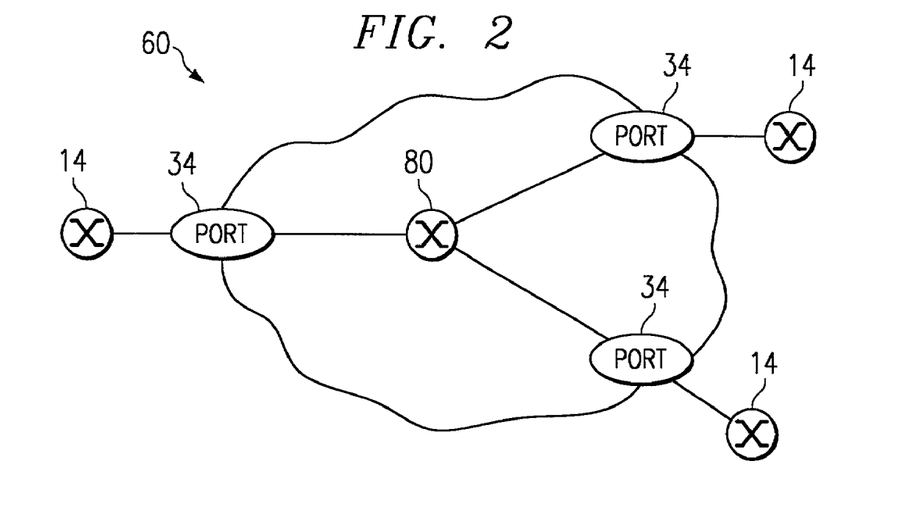
FIG. 2 is a block diagram illustrating an external representation for the transport router of FIG. 1 in accordance with one embodiment of the present invention.

FIG. 2 illustrates details of the transport router 60 in accordance with one embodiment of the present invention. In this embodiment, the transport router 60 comprises a simple port group and acts as a single network element within a customer's autonomous network.

Referring to FIG. 2, the transport router 60 includes geographically distributed ports 34 connected to external routers 14. The external ports 34 form a port group 50 with point-to-multipoint connectivity between the ports 34 as externally represented by the router 80. Accordingly, traffic from any one of the external routers 14 may be routed from an ingress port 34 directly to any number of the other external routers 14 by router 80.

The transport router 60 includes a router identifier to peer with the external routers 14 and participate in reservation and other protocol exchanges. In a particular embodiment, the transport router 60 peers with subtending routers 14 by using interior gateway protocols (IGP) such as OSPF, IS-IS, or RIP. The transport router 60 may peer using an exterior gateway protocol (EGP) or any other suitable protocol.

Figure 3:
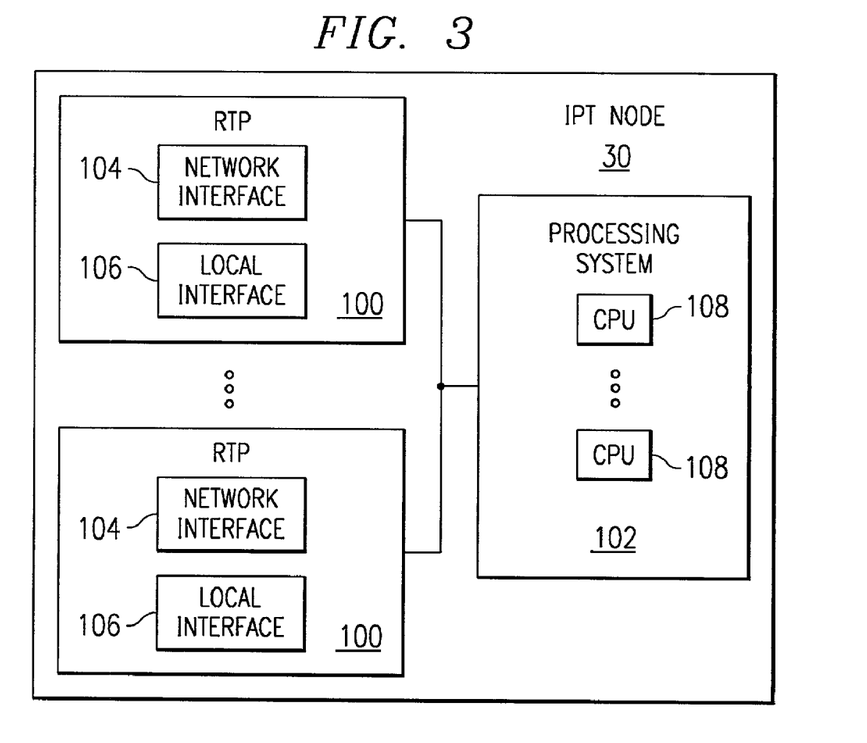
FIG. 3 is a block diagram illustrating details of the Internet protocol transport (IPT) node of FIG. 1 in accordance with one embodiment of the present invention.

FIG. 3 illustrates details of the IPT node 30 in accordance with one embodiment of the present invention. In this embodiment, the IPT node 30 comprises an add/drop multiplexer (ADM) with modular building blocks to support a scalable, pay-as-you-grow architecture. Accordingly, the transport network 10 owner may add functionality and incur cost based on customer demand. The IPT node 30 comprises logic encoded in software or hardware media for performing functions of the node. The logic may be distributed between discrete cards in the node.

Referring to FIG. 3, the IPT node 30 includes one or more receiver-transceiver pairs (RTP) 100 and a processing system 102 interconnected by an internal Ethernet connection. As described in more detail below, each RTP 100 includes one or more internal interfaces 104 and one or more local interfaces 106. The internal interfaces are high-speed interfaces between the IPT nodes 30 while the local interfaces 106 are low-speed ports 34 accessible to external nodes and/or interfaces between FTSs.

Within the transport network 10, a set of internal interfaces 104 of the IPT nodes 30 are connected together between ports 34 of a port group 50 to form an FTS between the ports 34 and provide multipoint-to-multipoint and/or point-to-multipoint connectivity. In particular, a multiplexer of an internal interface 104 is connected to a demultiplexer of a next internal interface 104 in the FTS while a demultiplexer of the internal interface 104 is connected to a multiplexer of a previous internal interface 104 in the FTS. The FTSs are directionally-sensitive to preferentially route pass-through traffic over local ingress traffic. In this way, traffic for a transport element 52 is transported between an ingress and an egress port on an FTS to minimize delay within the transport network 10.

The processing system 102 includes one or more central processing units (CPUs) 108. The CPUs 108 may each operate the IPT node 30 or a transport element 52. A CPU 108 operating the IPT node 30 includes an operating system and control functionality for the IPT node 30. A CPU 108 operating a transport element 52 includes control functionality for the distributed components of the transport element 52.

Figure 4:
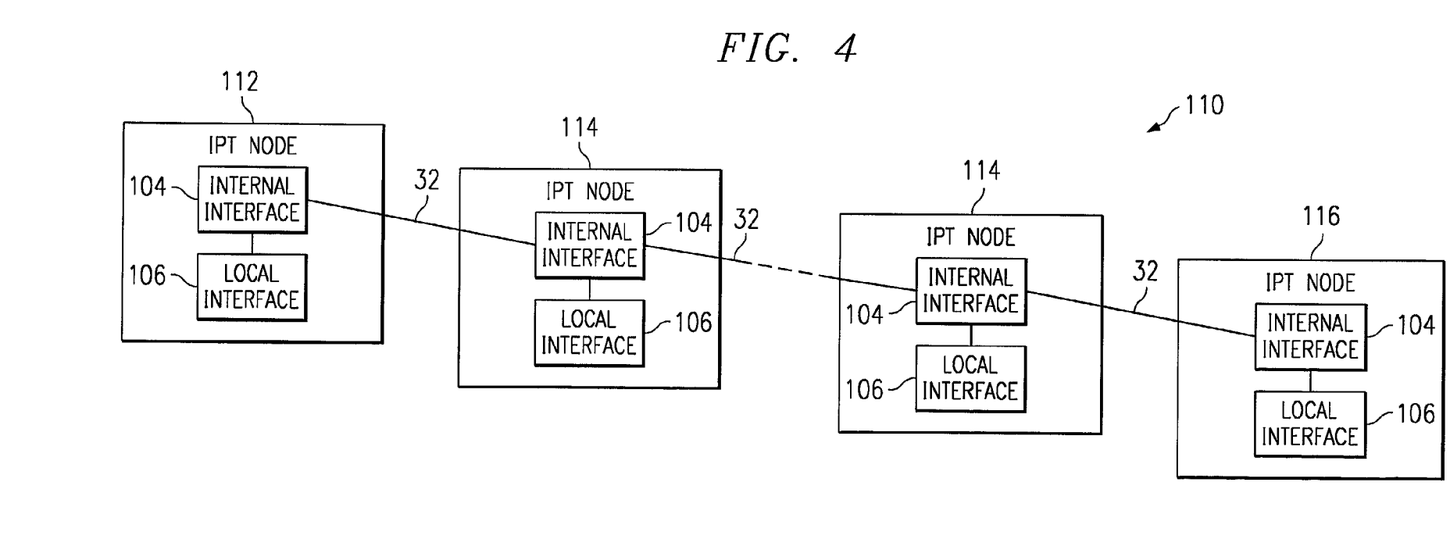
FIG. 4 is a block diagram illustrating a fast transport segment (FTS) defined through the transport network of FIG. 1 in accordance with one embodiment of the present invention.

FIG. 4 illustrates a FTS 110 in accordance with one embodiment of the present invention. In this embodiment, the FTS 110 comprises 10 Gb/s links and directionally-sensitive interfaces to provide a cumulative delay of less than 2.5 microseconds for a 1,500 bite maximum packet size. It will be understood that the FTS 110 may comprise other high-speed links and interfaces. A high-speed link is operable to transport traffic at a rate of 5 Gb/s or greater. Preferably, the high-speed links transport traffic at rates of 10 Gb/s or above.

Referring to FIG. 4, the FTS 110 comprises dedicated internal interfaces 104 and high-speed links 32 extending from a source node 112 through a plurality of intermediate nodes 114 to a destination node 116. A local interface 106 is coupled to each of the internal interfaces 104 to allow local traffic to be added and dropped from the FTS 110.

As described in more detail below, in the FTS 110, each internal interface 104 segments local and pass-through traffic. The local traffic is dropped. The pass-through traffic is segmented into high and low priority pass-through traffic. The high priority pass-through traffic is transmitted along the FTS 110 preferentially over the low priority pass-through traffic and local ingress traffic from the local interface 106. The low priority pass-through is buffered. A traffic class is transmitted preferentially over other traffic when it is transferred first using needed bandwidths, the other traffic using remaining bandwidth for transmission.

The local traffic is segmented into high priority local traffic and low priority local traffic. The high priority local traffic is transmitted preferentially over the low priority pass-through traffic and the low priority local traffic. Accordingly, high priority pass-through traffic is transmitted without or with only minimum delay while avoiding starvation at the intermediate nodes 114.

The low priority traffic is transmitted based on remaining bandwidth availability. In one embodiment, the low priority pass-through traffic is transmitted preferentially over the low priority local traffic to give preference to pass-through traffic at all priorities. The high priority traffic may be reserve bandwidth traffic and the low priority traffic unreserved bandwidth traffic. In a particular embodiment, as described in more detail below, the high-priority traffic comprises internally defined guaranteed service and control load traffic and the low-priority traffic comprises internally defined best-effort traffic. Additional and intermediate priorities of traffic may be identified, segmented, and used to preferentially route traffic in the network.

In a particular embodiment, local and pass-through traffic is distinguished and segmented based on a shallow IP layer ⅔ lookup using the transport label. In this embodiment, the transport label identifies the corresponding packet as local or remote (pass-through) and identifies the internal QoS of the packet. Local traffic is dropped while the priority of the pass-through traffic is determined based on QoS for immediate transmission out or buffering. Similarly, ingress local traffic is labeled and analyzed to determine its transmission priority. Traffic having the same priority is transmitted in a first-in/first-out (FIFO) basis.

Figure 5:
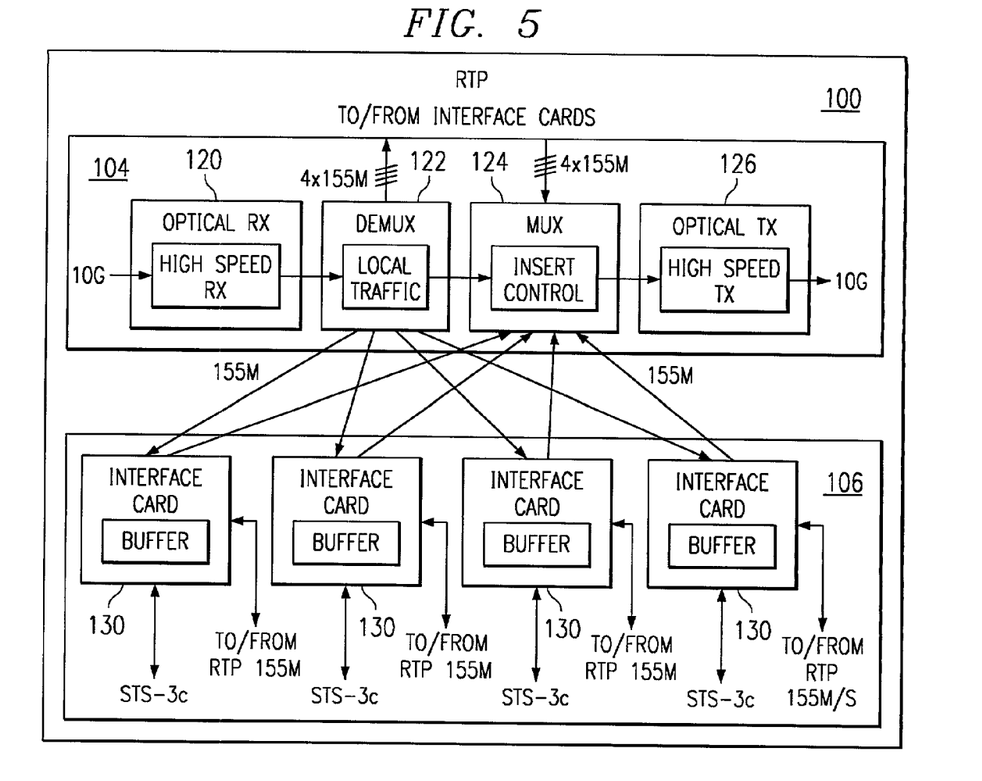
FIG. 5 is a block diagram illustrating details of the receiver-transmitter pair (RTP) of FIG. 3 in accordance with one embodiment of the present invention.

FIG. 5 illustrates details of the RTP 100 in accordance with one embodiment of the present invention. In this embodiment, the internal interface 104 is a high-speed interface that operates at substantially 10 Gb/s. The external interface 106 is a low-speed packet over SONET (POS) interface that operates at 2.5 Gb/s or below.

Referring to FIG. 5, the internal interface 104 includes an optical receiver 120, a demultiplexer 122, a multiplexer 124, and an optical transmitter 126. The optical receiver is a 10 Gb/s receiver without SONET or package level knowledge. The optical receiver 120 performs the optical to electrical signal conversion. The optical receiver 120 may include an amplifier and may directly interface with a wave division multiplex (WDM) system.

The demultiplexer 122 drops local traffic and inter RTP traffic as well as buffers transit traffic. In a particular embodiment, the demultiplexer 122 has a set of 155 Mb/s connections to interface cards of the external interface 106. The demultiplexer 122 may also have 155 Mb/s connections to interface cards of other RTPs 100.

The multiplexer 124 collects local traffic from the interface cards of the external interface 106 and through traffic from the demultiplexer 122. The multiplexer 124 includes packet buffer, scheduler and insertion control functionality.

The optical transmitter 126 is a 10 Gb/s transmitter without SONET or package level knowledge. The optical transmitter 126 may include an optical amplifier. The optical transmitter 126 performs a conversion from an electrical signal to an optical signal and may interface directly with a WDM system.

The local interface 106 include a plurality of low-speed interface cards 130. The low-speed interface cards 130 send and receive traffic to and from the multiplexer 124 and demultiplexer 122, respectively. The low-speed interface cards 130 also provide connections between the FTSs.

The low-speed interface cards 130 are the main buffering point for ingress and egress traffic of the transport network 10. Packet level intelligence, including routing and protection mechanisms, are provided by the low-speed interface cards 130. If the transport network 10 uses an isolated addressing scheme, the low-speed interface cards 130 perform NAT functionality.

In a particular embodiment, low-speed interface cards 130 each include a buffer for each internal QoS class, which as previously described, may be guaranteed service, control load and best effort. In this and other embodiments, each buffer may discard packets based on its own thresholds, independent of the others. Because guaranteed service and control-load traffic have reserved paths, comforming traffic typically will not be dropped. Best-effort traffic will be dropped based on congestion at the node.

Traffic received by the interface cards 130 from external links are associated with a corresponding data flow and a transport label generated for and/or added to packet for transport through the network. In generating the label, the interface card 130 maps the external QoS class to one of the reduced number of internal QoS classes. The external QoS classes are defined outside or independently of the transport, private or other suitable network and may be well-defined classes such as standardized classes. The internal QoS classes are defined by and/or within the network. The packet with the appended label is queued in a corresponding buffer and transmitted across the network along a path identified by the label and based on its internal QoS class. To provide a QoS guarantee for each new traffic flow, a path through the network that has sufficient resources to meet the flow's requirements is identified. The flow's requirements may be bandwidth and/or delay guarantees. In one embodiment, feasible paths are dynamically determined based on availability of network resources throughout the network. In this embodiment, network resources are stored in a link state database in the IPT nodes 30 which are provisioned and/or updated using opaque link state advertisement (LSA) to advertise the available link bandwidth and propagation delay in the network.

A constraint shortest path first (CSPF), open shortest path first (OSPF) or the suitable algorithm may utilize the link state database to compute feasible paths and/or optimal paths. The CSPF and/or OSPF algorithms may comprise Bellman-Ford or Dijkstra algorithms and may be optimized for one cost, such as bandwidth or propagation delay. To satisfy both requirements for a connection, sequential filtering may be used. In this embodiment, paths based on bandwidth or other primary metric are computed first and a subset of them eliminated based on propagation delay or other secondary metric until a single, optimum or acceptable path is found. For a guaranteed service or control load traffic, bandwidth for the path is reserved using a signaling or other suitable protocol. Paths may be reserved as described in co-owned US patent application entitled "System and Method for Application Object Transport", filed Jun. 6, 2000. It will be understood that suitable, preferred and/or optimal paths may be otherwise determined based on availability of network resources and that bandwidth may be otherwise suitably reserved in the transport network. For example, paths may be identified through the transport network by pruning links that do no have enough bandwidth to meet the bandwidth request with a probability greater than a defined value and minimum-hop paths computed based on the pruned topology. In this embodiment, if there are two or more minimum-hop paths, the one with the largest available bandwidth may be chosen. In addition, to account for inaccurate information on network resource availability, a weighing metric may be used and adjusted to account for the probability distribution function. In a particular embodiment, OSPF and IS-IS extensions carried via opaque LSA's may be used to gather resource availability. In a particular embodiment, the extension comprises Router Address TLV (type 1), Link TLV (type 2), Link Type sub-TLV (sub-type 1), Link ID sub-TLV (sub-type 2), Local Interface IP Address sub-TLV (sub-type 3), Remote Interface IP Address sub-TLV (sub-type 4), Traffic Engineering Metric sub-TLV (sub-type 5), Maximum Bandwidth sub-TLV (sub-type 6), Maximum Reservable Bandwidth sub-TLV (sub-type 7), Unreserved Bandwidth sub-TLV (sub-type 8), Resource Class/Color sub-TLV (sub-type 9), Router ID TLV (type 134), Extended IP Reachability TLV (type 135), Extended IS Reachability TLV (type 22), Administrative Group sub-TLV (sub-type 3), IPV4 Interface Address sub-TLV (sub-type 6), IPV4 Neighbour Address sub-TLV (sub-type 8), Maximum Link Bandwidth sub-TLV (subtype 9), Maximum Reservable Link Bandwidth sub-TLV (sub-type 10), Unreserved Bandwidth sub-TLV (sub-type 11), TE Default Metric sub-TLV (sub-type 18).

Figure 6:
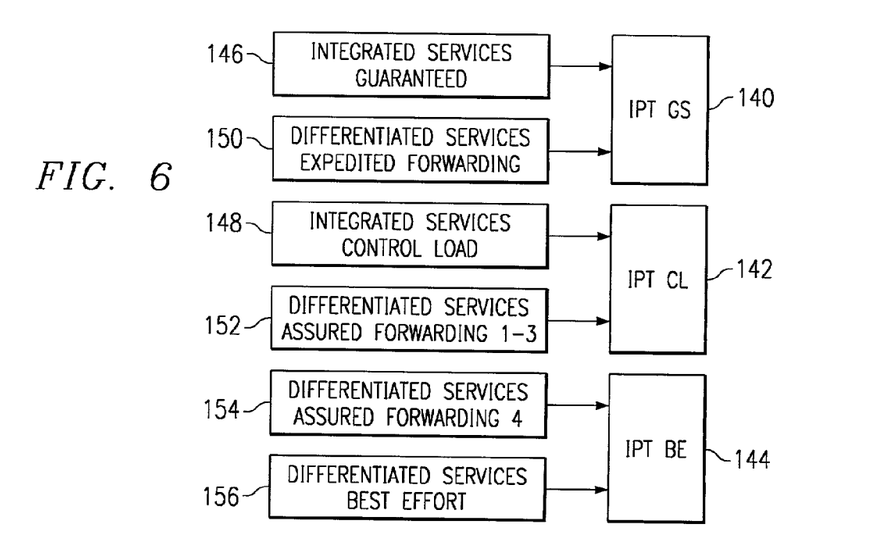
FIG. 6 is a block diagram illustrating combining defined quality of service (QoS) classes into IPT QoS classes for transport in the network of FIG. 1 in accordance with one embodiment of the present invention.

FIG. 6 illustrates combining packets having disparate external QoS classes into internal IPT QoS classes for transport in the network 10 in accordance with one embodiment of the present invention. In this embodiment, integrated and differentiated services classes are combined into three internal IPT classes. It will be understood that other standardized or well-defined service classes may be similarly combined into the reduced or other suitable set of internal QoS classes without departing from the scope of the present invention.

Referring to FIG. 6, the internal QoS classes include an IPT guaranteed service class (gs) 140, an IPT control load (CL) class 142, and an IPT best effort (BE) class 144. In an particular embodiment, the IPT GS class 140 is characterized by low latency with delayed bound guarantees and a low drop priority. This service utilizes reservation. The IPT CL class 142 is characterized with no delay bound guarantees but with flexible drop priority. This class also uses reservation. The IPT BE class 144 provides no delivery guarantees in accordance with transmission of standard data traffic over the Internet. The IPT classes 140, 142 and 144 together support a subset of the standardized QoS features with non-essential features combined to reduce the number of QoS classes, which may reduce the cost and complexity of the network 10. Accordingly, the IPT classes 140, 142 and 144 each represent a queuing behavior type and/or behavior aggregate.

For the standardized integrated services QoS classes, the guaranteed class 146 is mapped into the IPT GS class 140. Guaranteed class 146 provides an assured level of bandwidth that when used by a policed flow produces a delay bounded service with no queuing loss for all comforming packets. The guaranteed service 146 does not attempt to control the minimal or average delay of a packet, but controls the maximum queuing delay. The guaranteed service 146 guarantees the packets will arrive within the guaranteed delivery time and will not be discarded due to queued overflows, provided that flow's traffic stays within the specified traffic parameters. The service is used by real-time applications that require packets to arrive no later than a certain time after transmission by a source. For example, the guaranteed service 146 may be used by audio and video play-back applications.

The integrated services control load class 148 is mapped into the IPT CL class 142. The control load class 148 provides an end-to-end behavior tightly approximating the behavior visible to applications receiving best-effort service under unloaded conditions. A very high percentage of transmitted packets will be successfully delivered by the network to the receiving end nodes. The transit delay experience by a high percentage of the delivered packets will not greatly exceed the minimum transmit delay experience by any successfully delivered packet. Should traffic fall outside an estimated amount, a large number of packets may be delayed or dropped.

For the differentiated services, the expedited forwarding class 150 provides a low loss, low latency, low jitter, assured bandwidth end-to-end service. The service appears to the endpoints like a point-to-point connection by a virtual lease line. The expedited forwarding class 150 is mapped to the IPT GS class 140 along with the guaranteed class 146. Accordingly, the IPT GS class comprises traffic within assured level of bandwidth, and low loss, low latency, low jitter or other delay-bounded requirements corresponding to standardized classes. In one embodiment, each metric for defining an internal class 140, 142 and/or 144 may be the strictest metric of the combined standardized classes.

The differentiated services assured forwarding classes (1, 2 and 3) 152 provide separate levels of forwarding assurances with one of three possible drop-precedence values. In case of congestion, the drop precedence of a packet determines the relative importance of a packet within the assured forwarding class 152. Packets with a lower-drop precedence value are protected by preferably discarding packets with a higher drop precedence value. Each assured forwarding group is provided a minimum forwarding bandwidth assurance, and any excessive bandwidth is fairly shared. The assured forwarding groups 1, 2 and 3 are mapped to the IPT CL class 142 along with the control load services 148. Accordingly, the IPT CL class comprises traffic with no delay bound and a flexible drop priority in accordance with the corresponding defined service classes. The IPT CL Class 142 has no specified latency but may require reservation by signaling or SLA.

Differentiated services assured forwarding 4 class 154 is mapped into the IPT BE class 144 along with the differentiated services best effort class 156. Alternatively, assured forwarding group 4 may be supported by the IPT CL class 154. The IPT BE class provides no latency limits or reservation. In this way, a large number of externally-defined and/or standardized QoS classes can be supported by a reduced set of internally defined QoS classes, which support the most important features of the defined external QoS classes.

Figure 7:
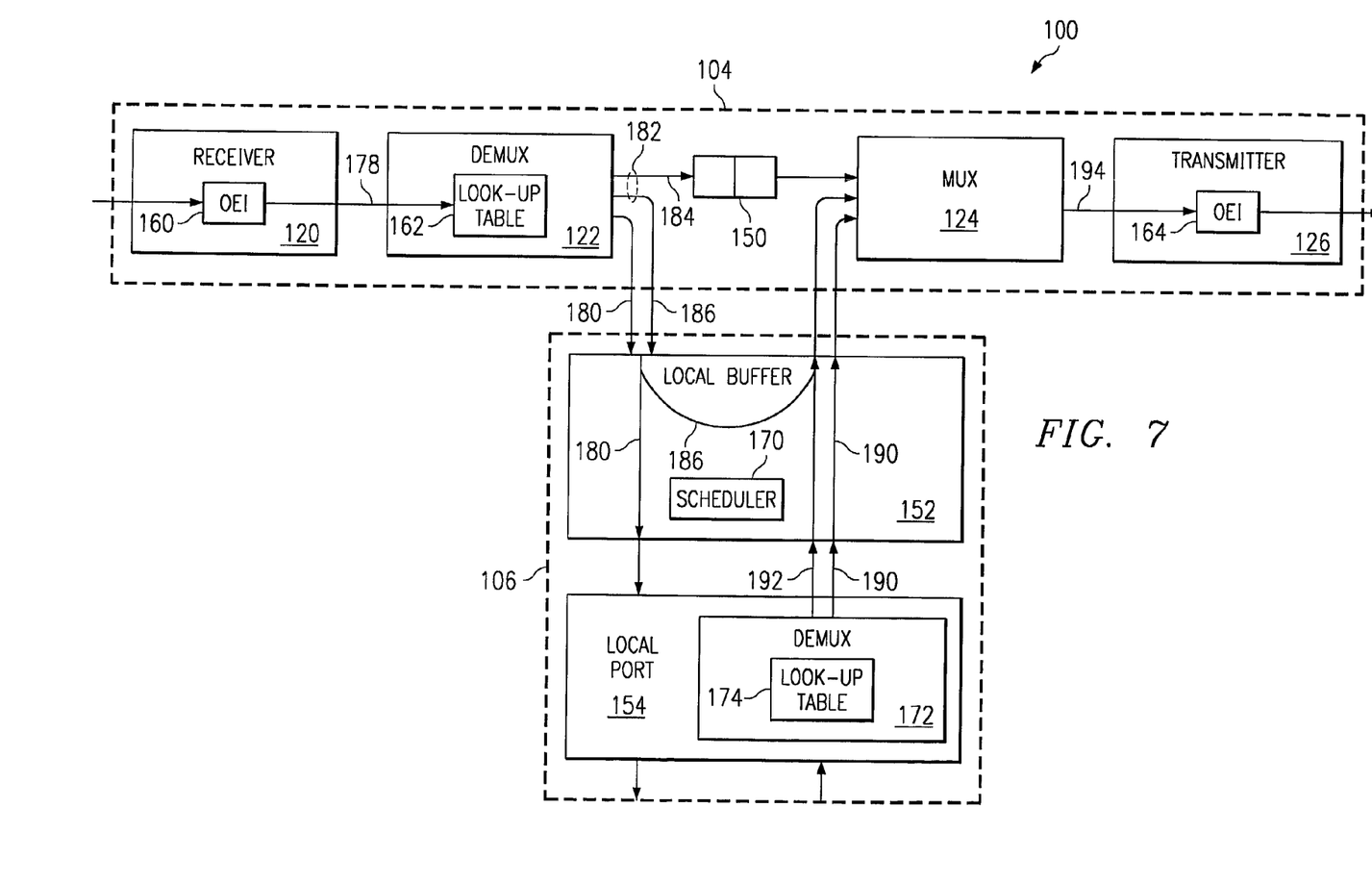
FIG. 7 is a block diagram illustrating traffic flow through the RTP of FIG. 5 in accordance with one embodiment of the present invention.

FIG. 7 illustrates traffic flows through the RTP 100 in accordance with one embodiment of the present invention. In this embodiment, traffic is distinguished, segregated, and processed based on a two level, low/high priority scheme, with the IPT GS and IPT CL classes 140 and 142 comprising the high priority traffic. It will be understood that the traffic flows may be segmented into any number of suitable traffic types based on QoS and other suitable traffic type identifiers.

Referring to FIG. 7, the RTP 100 includes internal interface 104 and local interface 106. The internal interface 104 includes the receiver 120, demultiplexer 122, multiplexer 124 and transmitter 126. A traffic buffer 150 is coupled between the demultiplexer 122 and multiplexer 124. The local interface 106 includes a local buffer 152 coupled between the demultiplexer 122, multiplexer 124 and a local port 154.

The receiver 120 includes an optical to electrical interface (OEI) 160 for converting ingress optical signals from the high-speed optical links 32 to electrical signals. The demultiplexer 122 includes a lookup table 162 for identifying pass-through and local traffic. The transmitter 126 includes an OEI 164 for converting an egress traffic stream to optical signals for transmission over the high-speed optical links 32. The transmit buffer 150 is a two packet or other suitable sized buffer operable to hold direct pass-through packets while the multiplexer 124 completes processing of a current packet.

The local buffer 152 receives low priority pass-through traffic of the IPT BE class 144 and buffers the traffic for transmission based on bandwidth availability. Egress local traffic is dropped through the local buffer 152 to the local port 154 for transmission to a local designation or another FTS 110. The local buffer 152 also receives and buffers ingress high and low priority local traffic for transmission on the FTS 110 based on bandwidth availability. Local buffer 152 may include a scheduler 170 to shape low priority pass-through and local traffic.

The local port 152 receives and transmits local traffic. In one embodiment, the local port 152 includes a demultiplexer 172 with lookup table 174 for distinguishing and segmenting high and low priority ingress local traffic. This allows all high priority traffic to be transmitted preferentially over all low priority traffic regardless of the source and/or the destination of the traffic. Within the high priority traffic, packets from the IPT GS class 140 may be preferentially transmitted over packets in the IPT CL class 142.

In operation, an ingress traffic stream is received at the receiver 120 and converted to an electrical packet stream 178 by OEI 160. The packet stream 178 is demultiplexed by demultiplexer 122 into discrete packets and segmented into local egress traffic 180 and pass-through traffic 182. The pass-through traffic 182 is further segmented based on its QoS into high priority pass-through traffic 184 and low priority pass-through traffic 186.

The high priority pass-through traffic 186 is passed to the multiplexer 124 through the transmit buffer 150 while the low priority pass-through traffic 186 is dropped to the local buffer 152. The local buffer 152 drops egress local traffic 180 and hairpins low priority pass-through traffic 186 for transmission back on the FTS 110 based on bandwidth availability.

Local ingress traffic is demultiplexed at the local port 154 and segmented into high priority local ingress traffic 190 and low priority local ingress traffic 192 using the lookup table 174. The local buffer 152 receives and buffers the high and low priority local traffic 190 and 192 along with the low-priority pass-through traffic 186.

The multiplexer 124 inserts all high-priority pass-through traffic from the transmit buffer 150 into an egress traffic flow 194 immediately or, if active, immediately upon finishing a current packet. High priority local traffic 190 is inserted into available bandwidth with the low priority pass-through local traffic inserted into the remaining available bandwidth of the egress traffic flow and with the low priority pass-through and local traffic inserted into the remaining available bandwidth. The multiplexer 124 multiplexes the traffic flows into an egress traffic stream 194 that is converted to an optical signal by OEI 164 for transmission over the high speed optical link 32. In this way, high priority pass-through traffic passes the RTP 100 with little or no delay. Local high priority traffic is delayed transmission on the FTS 110 until bandwidth first becomes available. After that point, it is treated as pass-through traffic by downstream nodes to prevent additional delays. Accordingly, queuing delays can be estimated and are minimized in the network, which increases bandwidth manageability and applications that can be supported by the network.

Figure 8:
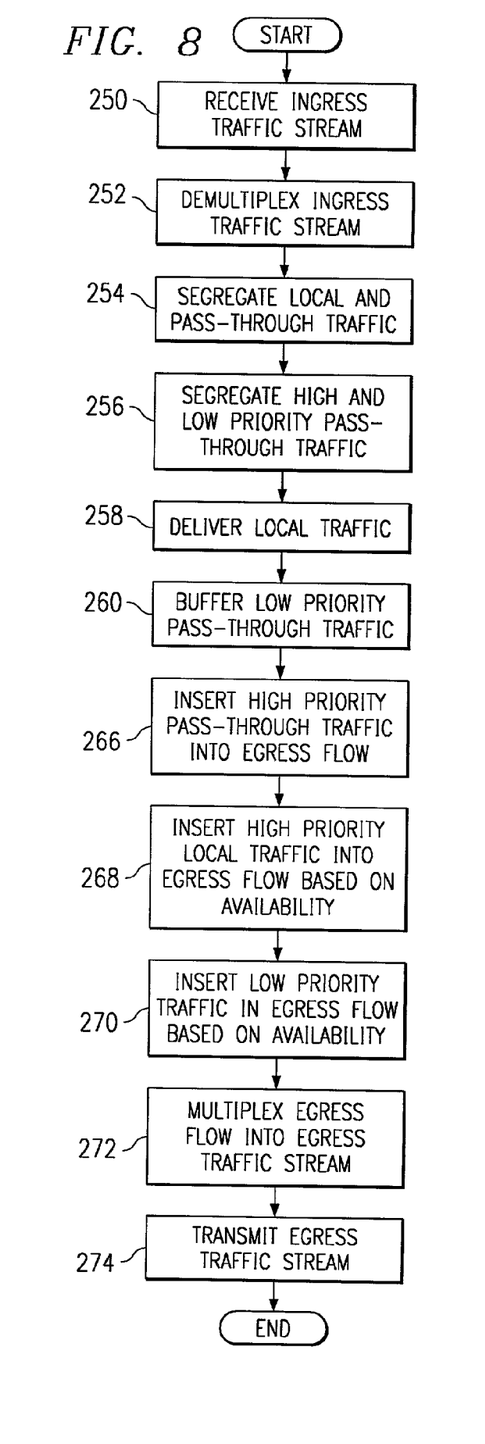
FIG. 8 is a flow diagram illustrating a method for processing traffic for QoS-based transport through the transport network of FIG. 1 in accordance with one embodiment of the present invention.

FIG. 8 is a flow diagram illustrating a method for processing traffic in a node for QoS-based transport across the transport network 10. The method begins at step 250 in which an ingress traffic stream is received. At step 252, the ingress traffic stream is demultiplexed into individual IP packets.

Proceeding to step 254, local and pass-through traffic is segregated. The traffic may be segregated using the transport label and a shallow lookup or a standard routing table lookup. At step 256, high and low priority pass-through traffic is segregated. In one embodiment, guaranteed, control load and control signal traffic using reserve bandwidth are treated as high priority traffic while best effort traffic using unreserved bandwidth is treated as low priority traffic.

Proceeding to step 258, local egress traffic is dropped. At step 260, low priority pass-through traffic is buffered. At step 266, high priority pass-through traffic is inserted into the egress flow for immediate transmission regardless of the amount of local traffic waiting transmission. At step 268, high priority local traffic is inserted into the egress flow based on bandwidth availability with guaranteed traffic given preference. Thus, all high-priority traffic is transmitted before low priority traffic is processed regardless of the source or destination of the low priority traffic.

Next, at step 270, the low priority traffic is inserted into the egress traffic flow based on remaining bandwidth availability. The low priority traffic may be inserted in a FIFO order or preferentially with pass-through traffic transmitted prior to local traffic. At step 272, the egress flows are multiplexed into an egress traffic stream. The egress traffic stream is transmitted on the FTS 110 at step 274. In this way, substantial cumulative delays are avoided in the network.

Although the present invention has been described with several embodiments, various changes and modifications may be suggested to one skilled in the art. It is intended that the present invention encompass such changes and modifications as fall within the scope of the appended claims.

What is claimed is:

1. A method for transporting traffic having disparate qualities of service across a packet-switch network, comprising:
   receiving at an ingress point of a network a plurality of packets each comprising a quality of service (QoS) class defined externally to the network;
   combining packets having a QoS class comprising delay bound guarantees and a low drop priority into a first internal QoS class;
   combining packets having a QoS class comprising a flexible drop priority and no delay bound guarantees into a second internal QoS class;
   combining packets having a QoS class comprising no delivery guarantees into a third internal QoS class; and
   transporting the packets through the network based on their internal QoS classes.

2. The method of claim 1, wherein the first internal QoS class comprises a guaranteed service class, further comprising combining into the guaranteed service class packets having an externally defined integrated services guaranteed service QoS and a differentiated services expedited forwarding QoS.

3. The method of claim 1, wherein the second internal QoS class comprises a control load class, further comprising combining into the control load class packets having an externally defined integrated services control load QoS and a differentiated services assured forwarding 1, 2 and 3 QoS.

4. The method of claim 1, wherein the third internal QoS class comprises a best-effort class, further comprising combining into the best-effort class packets having a differentiated services assured forwarding 4 QoS and a differentiated services best-effort QoS.

5. The method of claim 1, wherein the packets combined into the first internal QoS class comprise low latency delay-bound guarantees.

6. The method of claim 1, further comprising generating a label for each packet including the internal QoS class for the packet and transporting the packet through the network using the label.

7. The method of claim 1, wherein the packets comprise internet protocol (IP) packets.

8. The method of claim 1, wherein packets combined into the first internal QoS class comprise real-time data.

9. The method of claim 1, wherein the packets combined into the first internal QoS class comprise real-time voice data.

10. A system for transporting traffic having disparate qualities of service across a packet-switch network, comprising:
    means for receiving at an ingress point of a network a plurality of packets each comprising a quality of service (QoS) class defined externally to the network;
    means for combining packets having a QoS class comprising delay bound guarantees and a low drop priority into a first internal QoS class;
    means for combining packets having a QoS class comprising a flexible drop priority and no delay bound guarantees into a second internal QoS class;

means for combining packets having a QoS class comprising no delivery guarantees into a third internal QoS class; and means for transporting the packets through the network based on their internal QoS classes.

11. The system of claim 10, wherein the first internal QoS class comprises a guaranteed service class, further comprising means for combining into the guaranteed service class packets having an externally defined integrated services guaranteed service QoS and a differentiated services expedited forwarding QoS.

12. The system of claim 10, wherein the second internal QoS class comprises a control load class, further comprising means for combining into the control load class packets having an externally defined integrated services control load QoS and a differentiated services assured forwarding 1, 2 and 3 QoS.

13. The system of claim 10, wherein the third internal QoS class comprises a best-effort class, further comprising means for combining into the best-effort class packets having a differentiated services assured forwarding 4 QoS and a differentiated services best-effort QoS.

14. The system of claim 10, wherein the packets combined into the first internal QoS class comprise low latency delay-bound guarantees.

15. The system of claim 10, further comprising means for generating a label for each packet including the internal QoS class for the packet and transporting the packet through the network using the label.

16. The system of claim 10, wherein the packets comprise internet protocol (IP) packets.

17. The system of claim 10, wherein packets combined into the first internal QoS class comprise real-time data.

18. The system of claim 10, wherein the packets combined into the first internal QoS class comprise real-time voice data.

19. A system for transporting traffic having disparate qualities of service across a packet-switch network, comprising:

logic encoded in media; and the logic operable to receive at an ingress point of a network a plurality of packets each comprising a quality of service (QoS) class defined externally to the network, to combine packets having a QoS class comprising delay-bound guarantees and a low drop priority into a first internal QoS class, to combine packets having a QoS class comprising a flexible drop priority and no delay bound into a second internal QoS class, and to combine packets having a QoS class comprising no delivery guarantees into a third internal QoS class initiating the transport of the packets through the network based on their internal QoS classes.

20. A local interface for a packet-switched network node, comprising:

a port operable to receive a plurality of packets each comprising a quality of service (QoS) class defined externally to a network of the node and to combined packets having QoS classes comprising delay-bound guarantees and a low drop priority into a first internal QoS class, to combine packets having a QoS class comprising a flexible-drop priority and no delay bound guarantees into a second internal QoS class and to combine packets having a QoS class comprising no delivery guarantees into a third QoS class and to buffer the packets in buffers corresponding to their internal QoS classes; and a scheduler operable to schedule transmission of the packets out of the buffers for transmission over the network based on their internal QoS class.

* * * * *

UNITED STATES PATENT AND TRADEMARK OFFICE
CERTIFICATE OF CORRECTION

PATENT NO. : 7,075,927 B2  Page 1 of 1
APPLICATION NO. : 09/848994
DATED : July 11, 2006
INVENTOR(S) : Li Mo et al.

It is certified that error appears in the above-identified patent and that said Letters Patent is hereby corrected as shown below:

Column 9, Line 19, after "GS class" delete "140" and insert -- 148 --.
Column 11, Line 15, after "local buffer" delete "152" and insert -- 154 --.
Column 14, Line 22, after "and to" delete "combined" and insert -- combine --.

Signed and Sealed this

Fourteenth Day of October, 2008

JON W. DUDAS
*Director of the United States Patent and Trademark Office*